Figure 1:
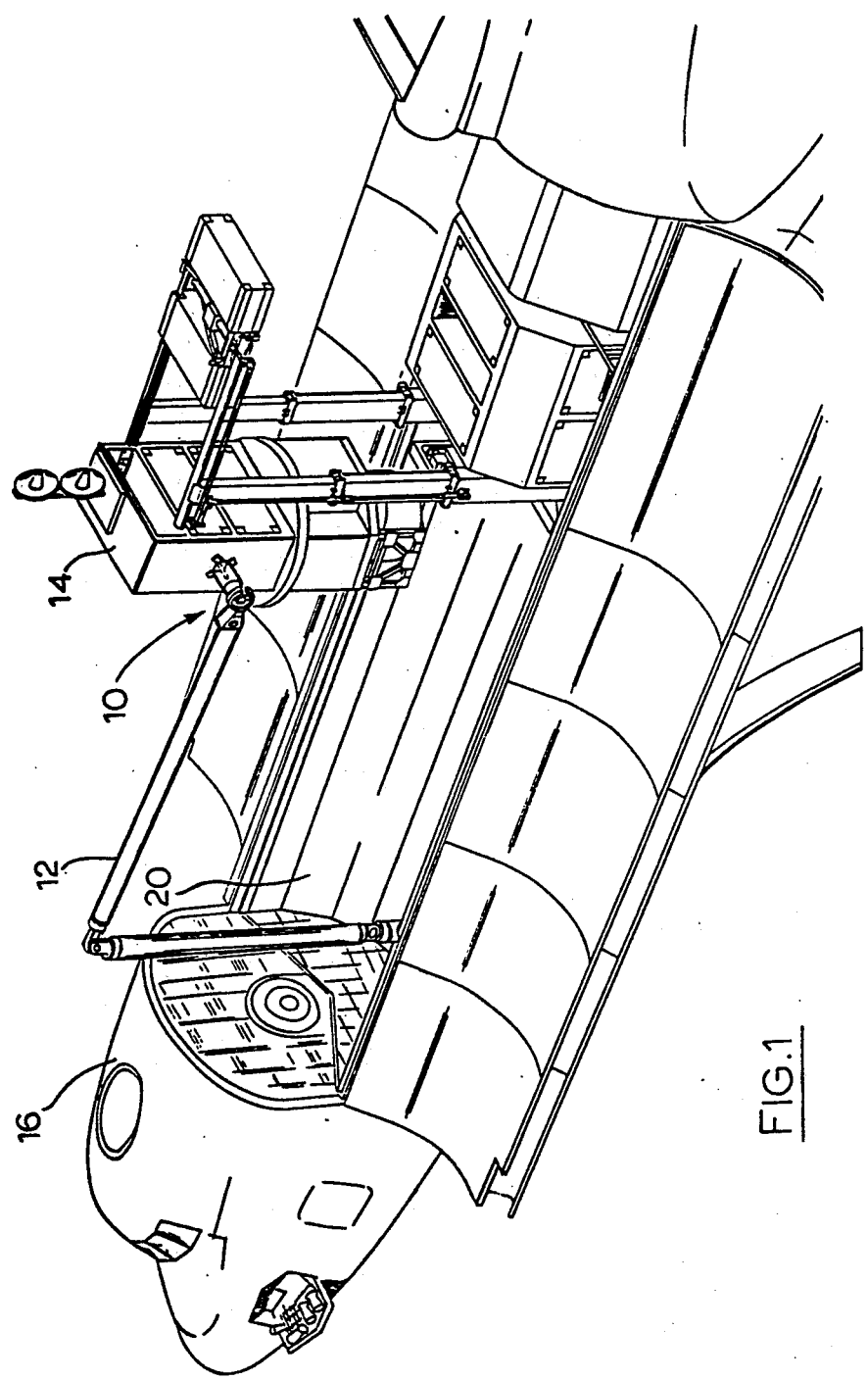

United States Patent [19]

Mee

[11] 4,105,241
[45] Aug. 8, 1978

[54] GRAPPLING DEVICE

[75] Inventor: Francis Herbert Arthur Mee, Aurora, Canada

[73] Assignee: Spar Aerospace Products Limited, Toronto, Canada

[21] Appl. No.: 732,815

[22] Filed: Oct. 15, 1976

[51] Int. Cl.² .............................................. B66C 1/10
[52] U.S. Cl. ............................. 294/86 R; 294/67 EA; 264/74
[58] Field of Search ................. 294/86 R, 67 EA, 66, 294/74, 4, 5.5, 860 G, 99, 19 R, 1, 55, 100; 24/243 CH

[56] References Cited

U.S. PATENT DOCUMENTS

| | | | |
|---|---|---|---|
| 3,589,765 | 6/1971 | Zematta | 294/86 R |
| 3,984,139 | 10/1976 | Battaglia | 294/19 |

Primary Examiner—James B. Marbert
Attorney, Agent, or Firm—Fetherstonhaugh & Co.

[57] ABSTRACT

A grappling device that is light-weight is formed with a light weight head. The interior of the head has three cables attached to two spaced rings so that rotary movement of the rings move the cables to open or closed configuration.

26 Claims, 21 Drawing Figures

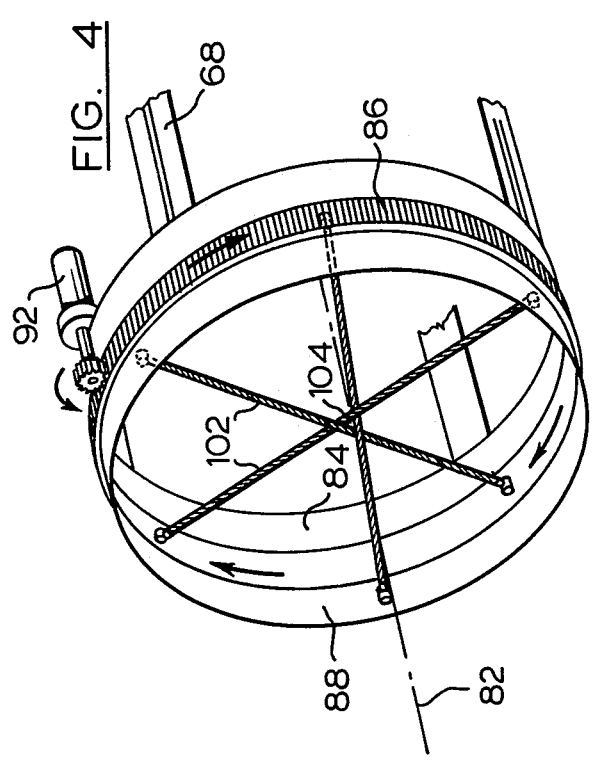
FIG. 4
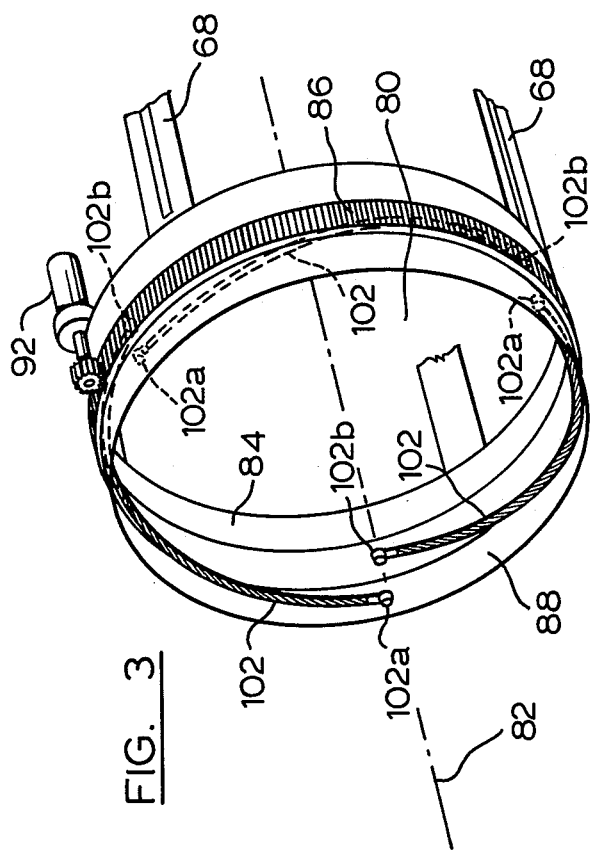
FIG. 3
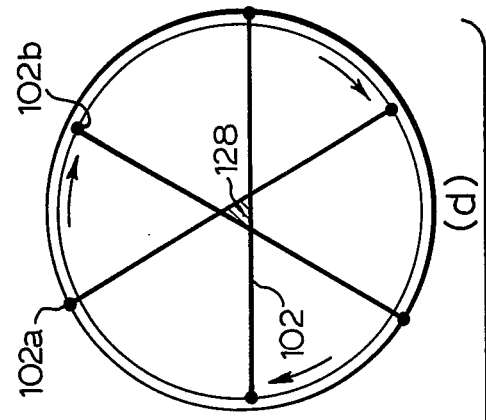
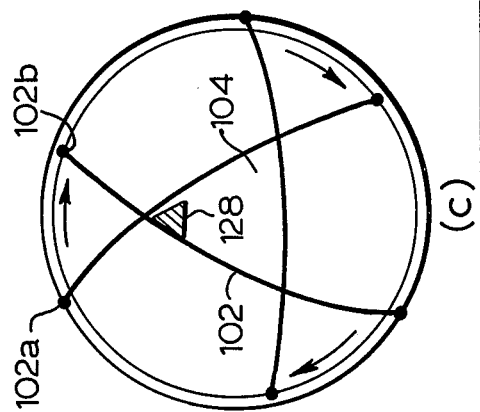
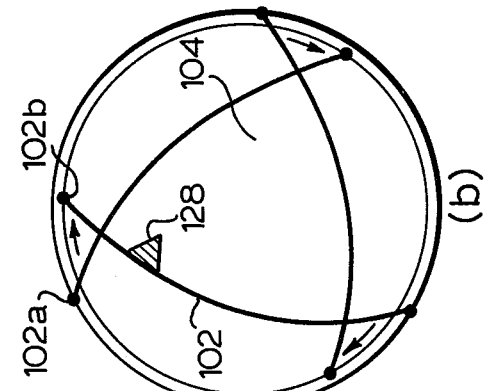
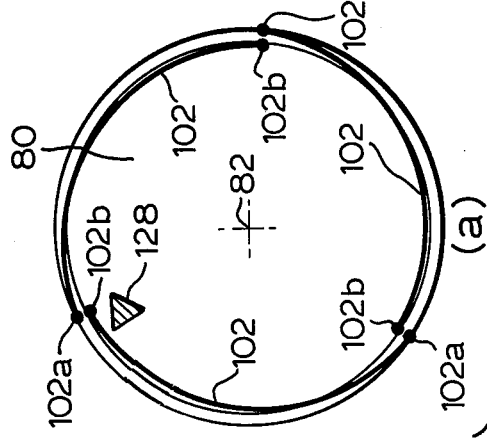
FIG. 5

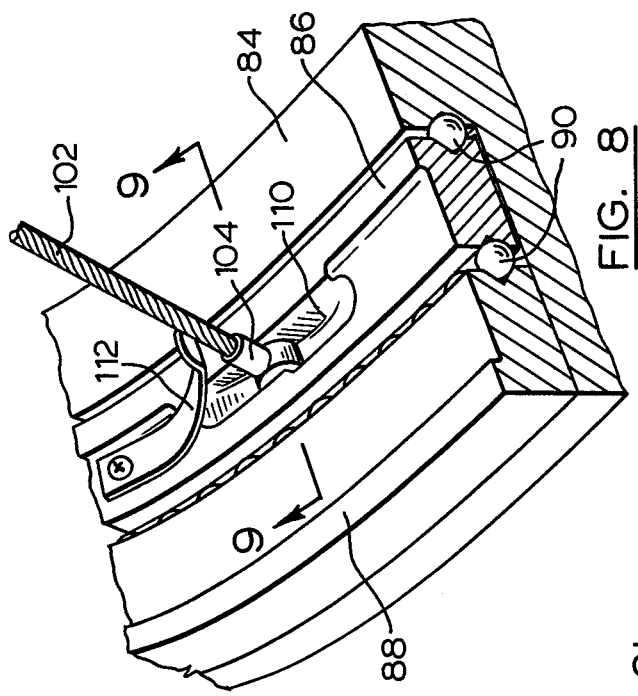
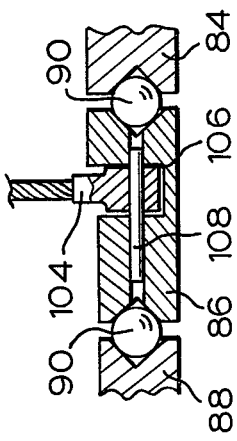
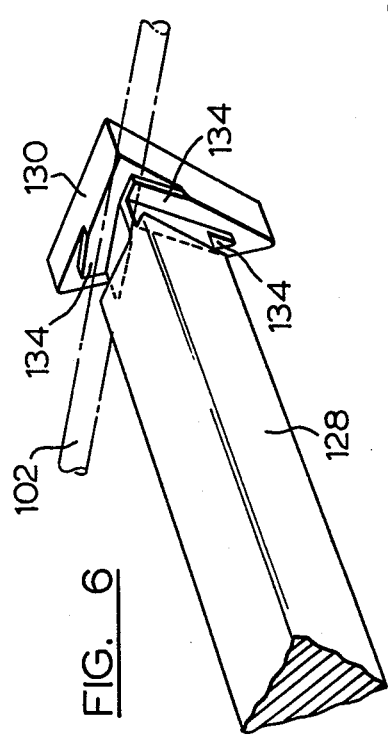
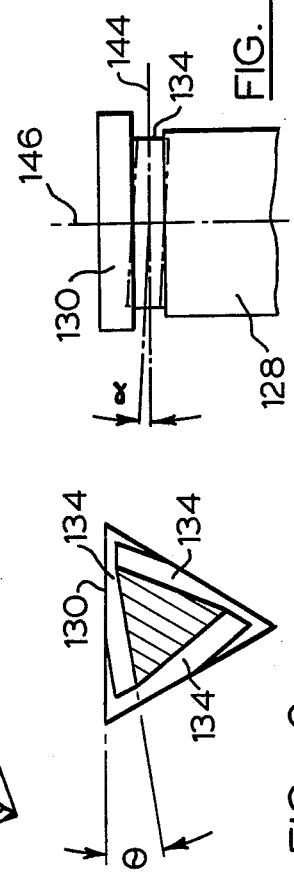
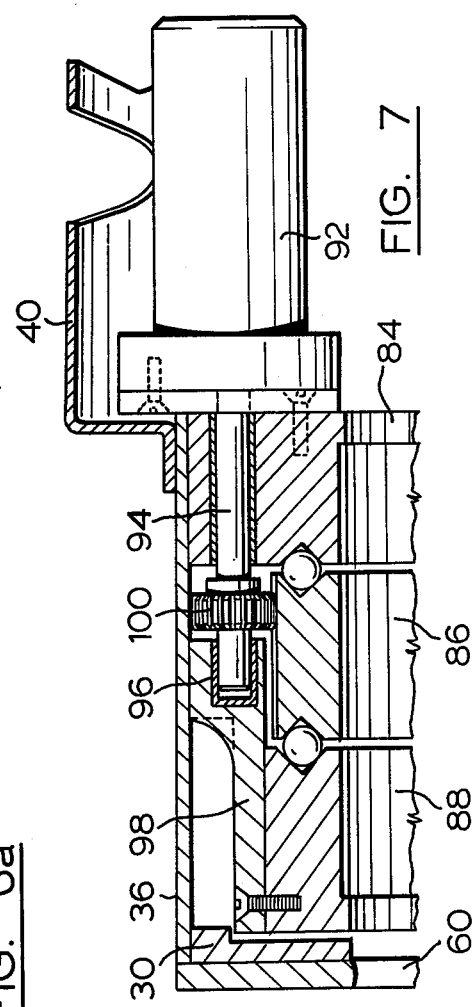

GRAPPLING DEVICE

FIELD OF INVENTION

This invention relates to grappling devices and couplers incorporating grappling devices.

PRIOR ART

In grappling devices which are presently available a plurality of rigid clamping fingers are used to clamp the article to be engaged thereby. These devices are generally heavy and require a complex drive mechanism for synchronizing the movement of the jaws with respect to one another.

The known grappling devices are generally designed such that the clamping jaws are spaced from one another such that in closing they move towards a central axis at a uniform speed. These devices are intended for use in an apparatus in which the object to be clamped is first centered quite accurately on the central axis and thereafter the jaws are closed. These structures have a very limited centering ability and will not function correctly if the object which is to be engaged thereby cannot be centered. The limited self-centering ability of these known devices prevents the jaws being used in a manner which will permit them to be moved far apart from one another to provide an opening therebetween which is substantially larger than the object to be clamped therein and to close about and center the object if the object is not located on the central axis towards which the jaws move in closing.

The present invention overcomes the difficulties of the prior art described above and provides a grappling device and a coupler incorporating a grappling device which is light in weight, simple to operate, has a rapid acting grappling action and is capable of centering the grappled component over the full range opening of the grappling device.

A substantial weight saving is achieved by using three flexible cables as the grappling elements. The speed of operation is great by reason of the fact that movement between the clamping position and a release position is effective by tightening and slackening the cables. Similarly, a large grappling window opening is made readily available by slackening the cables and causing them to be outwardly biased to the periphery of the window opening. The self-centering characteristic is provided by reason of the fact that when the cables are in the relaxed position their total length is such that each end of each cable overlaps an end of the adjacent cable at the periphery of the grappling window so as to form a continuous and circling band about the grappling window such that when the cables are tightened they are drawn together in a triangular configuration which extends continuously about the grappling axis.

In addition, the grappling device of the present invention has the capacity for applying an axial load to the component which is secured by the grappling cables so that when it is used in a coupling device it may serve to draw the components of the coupling device towards one another.

Simplicity of operation of the grappling device of the present invention is achieved by reason of the fact that one end of each cable of the grappling device is secured to a collar which extends about the grappling window so that in order to draw the flexible cables to a taut condition it is only necessary to rotatably drive the collar about the grappling axis.

The large grappling window is provided by biasing the cables so that when they move towards the relaxed position they will move away from the grappling axis to assume a curvature corresponding to the curvature of the grappling window.

In a coupler employing a grappling device as described above, a second component which is engaged by the grappling device preferably has a centering shaft formed with three grooves arranged in a triangular configuration to receive the grappling cables the provision of these grooves in the second component enables the grappling device to apply an axial load to the shaft of the second component tending to draw the second component inwardly of the first component.

In addition, in a coupling device of the type described above, a face-plate is preferably provided at the outer end of the head of the coupler to co-operate with shoulders formed on the second component for engagement with the face-plate to permit the second component to be rotatably driven by the first component about the grappling axis.

SUMMARY OF INVENTION

According to one aspect of the present invention there is provided a grappling device which comprises a grappling head having a grappling window opening inwardly thereof along a grappling axis, at least three flexible grappling cables mounted in the grappling head for movement between a first position in which they are taut and extend across the grappling window at uniformly spaced circumferential intervals to intersect one another to provide a grappling aperture therebetween within which a component may be centrally located with respect to the head by engagement with the grappling cables and a second position in which the grappling aperture is substantially enlarged to admit a component thereto and drive means mounted on the grappling head for moving the cables between the first and second positions.

According to a further aspect of the present invention there is provided a coupler which comprises a first component in the form of a grappling device as described above and a second component which is connectible to the first component, the second component consists of a shaft having a longitudinally extending axis, the shaft has an enlarged head portion at the free end thereof and three grooves are formed in the surface of the shaft adjacent the free end inwardly from the enlarged head, the grooves extend transversely of the longitudinal axis in planes which are circumferentially spaced about the longitudinal axis at 120° intervals with respect to one another in a triangular configuration, the grooves extend in transverse planes which are obliquely inclined with respect to the longitudinal axis and are arranged such that each groove is laterally displaced on opposite sides of the ends of each adjacent groove in a configuration corresponding to the interwoven configuration of the cables bounding on the grappling aperture of the first component.

PREFERRED EMBODIMENT

Figure 2:
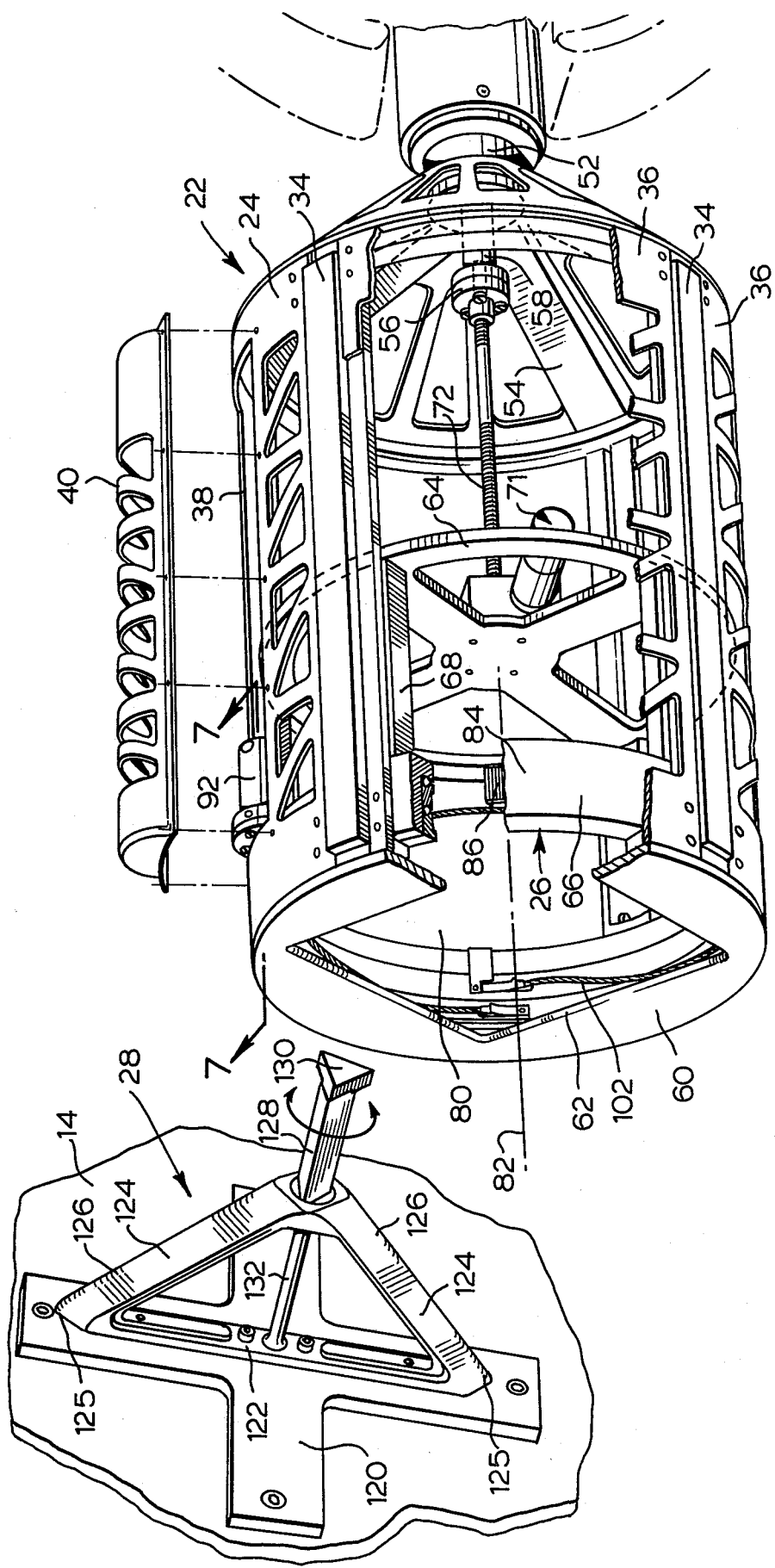
Figure 10:
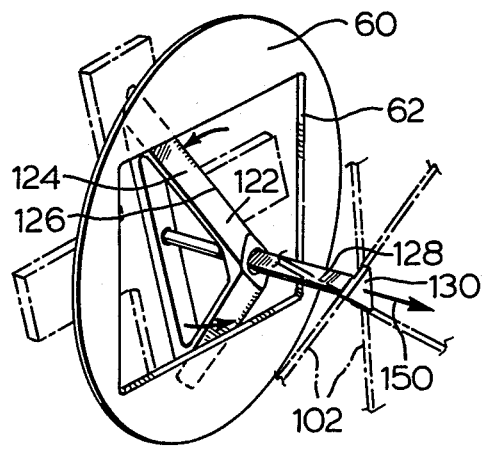
Figure 11:
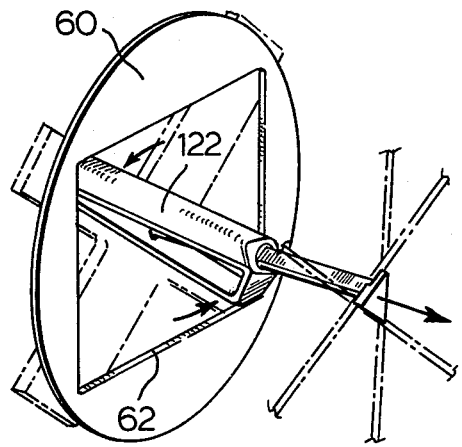
Figure 12:
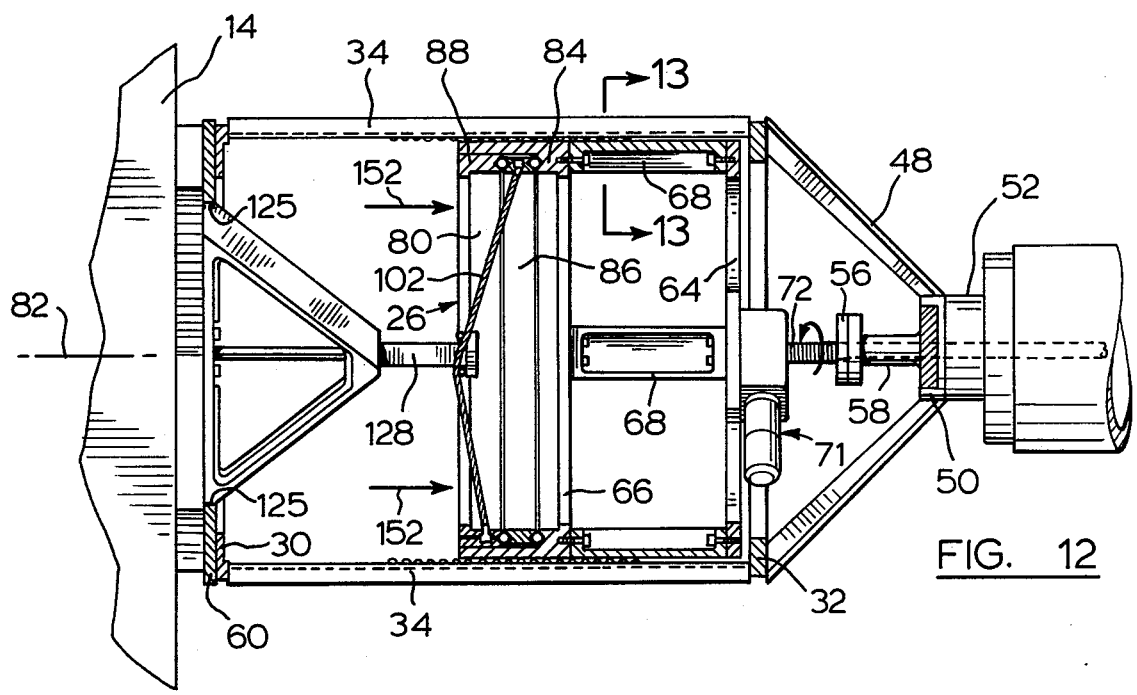
Figure 13:
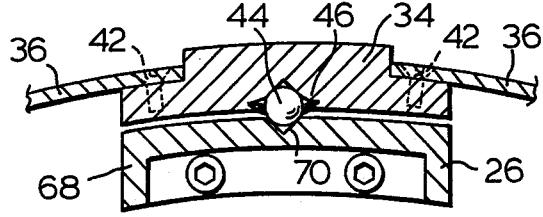

The invention will be more clearly understood after reference to the following detailed specification read in conjunction with the drawings wherein;

FIG. 1 is a pictorial view illustrating an orbital shuttle craft in which a grappling device of the present invention may be employed as an indefective component of a coupler for connecting the space craft to an orbiting satellite, FIG. 2 is a partially sectioned partially exploded view of a coupler incorporating a grappling device of the present invention, FIG. 3 is a pictorial illustration of the grappling device with the grappling cables in the relaxed position, FIG. 4 is a view similar to FIG. 3 showing the grappling cables in the taut position, FIGS. 5a, b, c and d, diagrammatically illustrate the centering action of the grappling device, FIG. 6 is an enlarged detailed view of the shaft of the second component of the coupler, FIG. 6a is a line diagram illustrating the phase displacement of the triangular configuration of the grooves of the shaft with respect to the triangular configuration of the shaft, FIG. 6b is a line diagram illustrating the relative positions of the grooves with respect to a plane extending perpendicular to the axis of the shaft, FIG. 7 is a cross-sectional view of a portion of the head of the grappling device illustrating the rotation drive mechanism, FIG. 8 is a sectional view through the grappling head illustrating the manner in which the ends of the cable are spring biased, FIG. 9 is a sectional view along the line 9—9 of FIG. 8, FIG. 10 is a pictorial view illustrating a first stage in the alignment of the second component with respect to the first component after the second component has been engaged by the grappling cables, FIG. 11 is a view similar to FIG. 10 showing the second component in the final position within the faceplate of the grappling head, FIG. 12 is a longitudinal sectional view of a coupler in which the grappling head is applying an axial load to the second component tending to draw it inwardly of the first component, and FIG. 13 is a sectional taken along the line 13—13 of FIG. 12.

Figure 14:
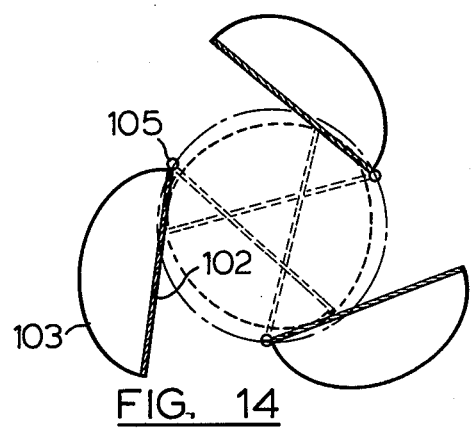

FIG. 14 is a diagramatic illustration of an alternative form of grappling device.

FIGS. 15a, and b are diagramatic illustrations of the operation of a grappling device having only two grappling cables.

In FIG. 1 of the drawings the reference numeral 10 refers generally to a coupling device incorporating a grappling device according to an embodiment of the present invention. The grappling device is mounted on the end of a wrist joint which is mounted on the end of a satellite to retrieval arm 12. The second component of the coupling device is mounted on a satellite 14. The satellite retrieval arm 12 is operable to align the grappling component of the coupler with the second component of the coupler such that the coupler components are connected to one another to permit the satellite retrieval arm to position the satellite 14 in the service bay 20 of the shuttle craft 16.

COUPLER

FIG. 2 of the drawings illustrates the components of the coupler of the present invention.

The first component which is generally identified by the reference numeral 22 consists of a housing 24 within which a grappling head 26 is mounted for longitudinal movement. In the embodiment illustrated one end of the housing 24 is mounted on the output shaft of a wrist joint of the type described above in co-pending application Ser. No. 732,733 filed Oct. 15, 1976 now U.S. Pat. No. 4,073,201. The second component is generally identified by the reference numeral 28 and is previously described with reference to FIG. 1 may be mounted on a satellite 14 or the like.

GRAPPLING HOUSING

As shown in FIGS. 2 and 12 of the drawings the grappling housing consists of a front ring 30 and a back ring 32 and four longitudinally extending ribs 34 extending there-between. Four coupler plates 36 extend circumferentially between the ribs 34 and are each formed with a plurality of apertures which serve to reduce their weight. A passage 38 is formed in one of the covers 24 to provide clearance to permit the grappling drive motor which will be described shortly thereafter to move longitudinally above the grappling head. A removable cover 40 is provided for closing the passage 38.

As shown in FIG. 13 of the drawings each of the longitudinal extending ribs 34 has a notch extending longitudinally of the upper face thereof to receive the side edges of the panels 36 which are secured thereto by mounting screws 42. A longitudinally extending ball race 44 is mounted in a passage 46 formed in the inner face of each rib 34 to support the grappling device 26.

A conical end piece 48 extends rearwardly from the ring 32 to a mounting ring 50 adapted to mount the first component on the output drive shaft 52 of a wrist joint of the type described in co-pending application Ser. No. 732,733. The conical member is reinforced by a plurality of ribs 54 which extend from the ring 32 to the ring 50. Again passages are formed in the conical shaped member 48 in order to reduce its weight. A jacking nut 56 is located in the inner end of a shaft 58 which projects inwardly from the mounting ring 50.

At the other end of the housing 24 a face-plate 60 is secured to the ring 30. Face-plate 60 has a square passage 62 opening therethrough.

The grappling head 26 consists of an inner plate 64 and an outer ring 66 which are connected to one another by four circumferentially spaced legs 68. The inner plate 64 is again formed with a plurality of passage opening therethrough in order to reduce its weight. Each of the legs 68 is formed with a V-shaped groove 70 extending longitudinally thereof within which the balls of the ball bearing race 44 are located to prevent rotation of the grappling head with respect to the housing.

A drive motor and its associated gear box which are generally identified by the reference numeral 71 are located on the back face of the plate 64. A threaded drive shaft 72 extends rearwardly from the drive motor through the drive nut 56 into a passage formed in the output shaft 52 of the wrist joint.

The outer ring component 66 has a grappling window 80 opening inwardly thereof. The grappling window 80 has a longitudinal grappling axis 82.

As shown in FIG. 8 of the drawings, the outer ring member 66 consists of a first ring member 84 which is secured to the legs 68 and which does not rotate with respect to the housing 24. A collar member 86 is mounted in a channel formed between a shoulder formed in the ring 84 and an outer ring 88 ball bearing races 90 serve to mount the collar 86 for free movement in the channel.

As shown in FIGS. 3 and 7 of the drawings, the outer surface of the collar 86 is formed with a plurality of gear teeth. As also shown in FIG. 7 of the drawings a motor 92 is mounted on the inner ring 84 with its drive shaft 94 extending through the ring 84 and having its outer end journalled in a bearing 96 supported by a support plate 98 which is secured to the outer ring 88. The outer ring 88 is secured against rotation with respect to the inner ring 84. When the drive motor 92 is operational a gear 100 which is mounted on the drive shaft 94 rotatably drives the collar 86 about the grappling axis.

The grappling action is achieved by means of three grappling cables 102 which are secured to the grappling head. FIGS. 8 and 9 of the drawings serve to illustrate the manner in which the ends of the cables 102 are secured to the grappling head. As shown in FIGS. 8 and 9 a terminal factor 104 is located at each end of the cable 102 and has a passage 106 extending therethrough. The terminal connector 104 is mounted on a pivot pin 108 which extends through the body of the collar 86. An arcuate shaped recess 110 is formed on the inner face of the collar 86 at each mounting point to permit the cable terminal mounting device 104 to pivot about the pivot pin 108. A leaf spring 112 is located on one side of the cable 102 to apply a biasing mode to the cable 102 tending to direct each of the cables 102 to the relaxed configuration shown in FIG. 3 of the drawings in which the cables extend about the periphery of the grappling passage.

OPERATION OF GRAPPLING DEVICE

The manner of operation of the grappling device is illustrated in principal in FIGS. 3, 4 and 5a through 5d to which reference is now made. As shown in FIGS. 3 and 4 of the drawings, a first end 102a of each of the flexible cables 102 is secured to the fixed ring 88 and is therefore secured against movement about the grappling axis 82. The other ends 102b of each cable 102 are secured to the collar 86 for rotation therewith in use. As shown in FIG. 3 of the drawings when the collar 86 is in the position in which the cables 102 are relaxed the end of each cable is located adjacent the end of another cable and the resilient spring members 112 (FIG. 8) caused the cables 102 to conform to the curvature of the grappling window 80.

The cables are tightened to provide the grappling action by activating the motor 92 to rotatably drive the collar 86 in the direction of the arrows shown in FIG. 4 of the drawings. The effect of rotatably driving the collar 86 is that the opposite ends of the cables 102 are moved away from one another to thereby tighten the cables 102. This action is illustrated in FIGS. 5a through 5d in which successive steps in the rotation of the collar 86 are illustrated. As shown in FIG. 4 of the drawings the cables 102 are interwoven with one another so that a load applied to any one cable in a direction of the grappling axis 82 will be transferred to the adjacent cable which will in turn transfer a portion of the load to the next adjacent cable thereby insuring that a portion of the load is carried by each cable. In order to release the grappling device the direction of rotation of the motor 92 is reversed so that the collar 86 is rotatably driven in a direction opposite to the direction illustrated by the arrows in FIG. 4 to return to the original position illustrated in FIG. 3. As the ring 86 moves away from the position shown in FIG. 4 the resilient springs 112 will take up the slack in the cables 102 so that the grappling aperture 104 will increase progressively in size.

As illustrated in FIGS. 5a through 5d a relatively small second component may be located in the grappling passage 80 at any position and it will be centered to the grappling axis as the grappling cables move to the taut position illustrated in FIG. 5d. This is an important feature of the present invention which serves to reduce the accuracy with which the components of the coupler must be aligned during the manipulation of one with respect to the other.

COUPLER SECOND COMPONENT

The second component 28 of the coupler consists of a base plate 120 (FIG. 2) which supports a triangular frame 122. The triangular frame 122 has a pair of shoulder member 124 each of which has a rounded ridge 126 extending longitudinally thereof. A triangular shaped shaft 128 is mounted for rotation in the frame 122. The shaft 128 has a triangular shaped head 130 located at the outer end thereof. The shaft 128 also has a stem portion 132 projecting rearwardly therefrom.

As shown in FIG. 6 of the drawings the shaft 128 has grooves 134 formed in its outer surface adjacent the enlarged head portion 130. One groove 134 is provided for each cable 102. The grooves 134 are arranged in a triangular configuration of the shaft 128 through an angle $\theta$ (FIG. 6a) of the order of about 5° to 10°. In addition, as shown in FIG. 6b each of the channels 134 is angularly inclined with respect to the transverse plane 144 which extends perpendicular to the longitudinal axis 146 of the shaft 128 through an angle $\alpha$ of about 5°. The grooves are arranged such that the end of each groove is laterally displaced on opposite sides of the center of the width of each adjacent groove in a configuration corresponding to the interwoven configuration of the flexible cables bounded on the grappling aperture of the first component.

FIGS. 10 and 11 of the drawings illustrate the manner in which the face plate 60 serves to guide the triangular frame 122 to a position in which it extends across a diagonal of the passage 62 formed therein. FIG. 10 of the drawings illustrates a position which the triangular frame member 122 may be located with respect to the face plate 60 following engagement of the shaft 128 by the grappling cables 102 prior to longitudinal movement of the grappling head with respect to the housing. In this position the shaft 128 has been centered with respect to the grappling axis 82 as previously described with reference to FIGS. 5a to 5d. The grappling head 26 is then moved inwardly of the grappling housing as will be described hereinafter to apply a load to the shaft 128 in the direction of the arrow 150. The rounded ridge 126 of the triangular frame 124 bears against the edge of the face plate 62 such that the load which is applied to the shaft 128 in the direction of the arrow 150 causes the triangular frame 124 to rotate with respect to the shaft in the direction of the arrows indicated in FIGS. 10 and 11. The rotation will continue until the triangular frame assumes the position shown in FIG. 11 wherein it is aligned with a diagonal of the passage 62. It will be noted in FIG. 2 of the drawings that at the inner end of each of the members 126 there is a short length 125 which extends perpendicularly from the base plate 120. This portion 125 is adapted to fit in a close fitting relationship within the corners of the opening 62 in the face plate 60. This connection permits the face plate 60 to engage the frame 122 in a manner such that if the face plate 120 is rotatably driven it will rotatably drive the triangular frame member 122 and thereby the second component 14. As previously indicated the face plate 60 is mounted on the housing which is in turn mounted on the output shaft 52 of a powered wrist joint such that the second component 14 can be rotatably driven through the coupler.

METHOD OF OPERATION

When the coupler is used in an aerospace application such as the servicing of orbiting satellites by means of a shuttle craft such as that illustrated in FIG. 1 of the drawings, the first component of the coupler is carried by the shuttle craft and the second component is carried by the satellite. In order to capture the satellite the grappling head is set in the position shown in FIG. 2 of the drawings in which the grappling cables are in the relaxed configuration spaced outwardly from the periphery of the passage 62 formed in the face plate 60. The grappling head is also located at the forward end of the housing 22, again as illustrated in FIG. 2. The support arm 12 and the wrist joint are activated to manipulate the housing 22 to a position in which the shaft 128 of the second component is located within the grappling window 80 with the enlarged head portion 130 located inwardly of the plane of the grappling cables. As previously indicated it is not necessary that the shaft 128 be located on the grappling axis. When the shaft 128 is located within the grappling window the motor 92 is activated to rotatably drive the collar 86 to move the adjacent ends of the flexible cables away from one another as diagrammatically illustrated in FIGS. 5a to 5d of the drawings. At least one of the cables 102 will engage the shaft 128 as illustrated in FIG. 5b and draw the shaft towards the grappling axis. This action will continue until the shaft 128 is located on the grappling axis as shown in FIG. 5d. During this initial engagement of the cables 102 with the shaft 128 the cables may engage any portion of the shaft 128 inwardly of the head 130 and may not initially be located within the grooves 134. The triangular configuration of the shaft 128 does, however, serve to align the grooves 134 in a position suitable to receive the cables 102. As previously indicated the shaft 128 is rotatable with respect to the triangular frame 124 so that it will rotate from a position as shown in FIG. 5a to the position shown in FIG. 5b by engagement with the cable 102 such that it will ultimately assume a position in which the triangular sides are aligned with the triangular configuration of the grappling aperture formed between the cables when the cables are taut. When the cables are taut the motor unit 71 is activated to drive the threaded shaft 72 inwardly of the nut 56 and thereby move the grappling head away from the face plate 60 at the outer end of the housing in the direction of the arrows 152 (FIG. 12). As this inward movement will initially assure that the cables 102 are located within the grooves 134. Further inward movement of the grappling head will cause the triangular frame 122 to be drawn inwardly of the face plate 60 as previously described with reference to FIGS. 10 and 11 of the drawings to the position in which the straight portion 125 of the shoulder 124 engages the corners of the passage 62 in the face plate. It will be noted that the cables 102 may assume the inclined position shown in FIG. 12. The interwoven triangular configuration which the cables 102 assume is, however, such that any increase in load which is applied in the direction of the grappling axis merely serves to draw the cables inwardly of the grappling aperture to increase their grip on the shaft 128. When the two elements of the coupler are connected as described above, the coupler may be rotatably driven about the grappling axis 82 as previously described by means of the drive shaft 52 so that the second component 14 may be moved with respect to the axis 82.

In order to release the second component the procedure outlined above is reversed.

From the aforegoing it will be apparent that the present invention provides a simple and efficient grappling mechanism and a coupler incorporating the grappling mechanism.

Various modifications of the present invention will be apparent to those skilled in the art without departing from the scope of the invention.

For example, it will be apparent that the grappling device has applications other than in the coupler mechanism described in the preferred embodiment. The fact that the grappling head is mounted in the housing for longitudinal movement in the direction of the grappling axis is not essential to the embracing grappling action of the grappling cables. Clearly there are many applications in which the grappling cables may be drawn sufficiently tightly around an article which is to be secured without requiring movement of the cables in the direction of the grappling axis. It should, however, be noted that there is a very substantial advantage to be derived from the structure of the present invention which permits movement of the cables in the direction of the grappling axis as has previously been described.

It will also be apparent that the grappling action may be achieved by means other than the connection of the flexible cables to adjacent ring members and it may be achieved without the necessity of tightening and slackening of the cables. As diagrammatically illustrated in the line diagram FIG. 14, the flexible cables 102 may extend between the ends of arcuate frame members 103 which are pivotally connected at pivot points 105 for movement between the position shown in solid lines in FIG. 14 and the position shown in broken lines. The position shown in broken lines is one in which the cables 102 are located in the same grappling position as that shown in FIG. 4 of the drawings. In this modification the cables 102 will remain taut in both the grappling and the release positions. While this modification has been described in order to illustrate that the invention is not limited to the structure described in the preferred embodiment, it is to be noted that there is a very substantial advantage to the ring structure described in the preferred embodiment in that it provides a very simple and compact mechanism for moving the cables between a release position and a grappling position.

Figure 15:
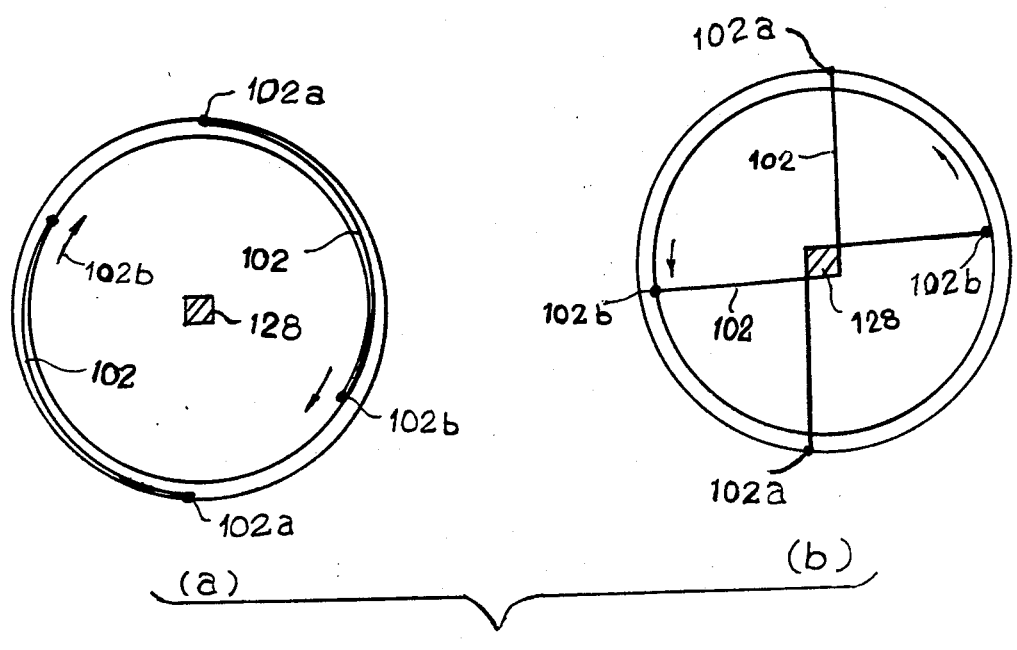

In a further modification of the grappling device, only two flexible grappling cables 102 are employed. This embodiment is diagrammatically illustrated in FIG. 15 of the drawings. FIG. 15a shows the positions of the cables 102 when in the relaxed configuration. As a result of rotation of the movement of the end 102b of the cables in the direction of the arrows shown in FIG. 15a the cables will tighten about the shaft 128 to the position shown in FIG. 15b. In this position the shaft 128 is tightly held by the cables 102. The shaft 128 is released by rotating the ends 102b in the direction of the arrows shown in FIG. 15b of the drawings.

These and other modifications of the present invention will be apparent to those skilled in the art without departing from the scope of the invention.

What I claim as my invention is:

1. A grappling device comprising (a) a grappling head having a grappling window opening inwardly thereof along a grappling axis, (b) at least two flexible grappling cables of a fixed length having opposite ends mounted on said grappling head at the grappling window, at least one end of each of said grappling cables being movable relative to said grappling head in the plane of said grappling window between a first position in which said grappling cables are taut and extend across the grappling window at uniformly spaced circumferential intervals to intersect one another and to provide a grappling aperture therebetween within which a component may be securely located with respect to said head by engagement with said grappling cables and a second position in which the grappling aperture is substantially enlarged without increasing the length of the grappling cables to admit a component thereto, and (c) drive means mounted on the grappling head for moving the grappling cables between said first and second positions.

2. A grappling device as claimed in claim 1 having three flexible grappling cables.

3. A grappling device as claimed in claim 2 wherein each cable has a first end and a second end, said first end of each cable being secured with respect to said grappling head against angular movement about said grappling axis, said second end of each cable being mounted for angular movement about said grappling axis in a direction towards and away from its first end whereby each cable may be tightened to assume said first position and slackened to assume said second position.

4. A grappling device as claimed in claim 3 including means for urging each said cables radially outwardly from said grappling axis to assume a concave curvature about said grappling axis in response to movement of said cables to said second position.

5. A grappling device as claimed in claim 4 including a collar mounted on said head for rotation about said grappling axis, each of said second ends of said cables being mounted on said collar for rotation about said grappling axis between said first and second positions.

6. A grappling device as claimed in claim 5 wherein each cable is interwoven with respect to each adjacent cable when in said first position to transmit a load applied in the direction of the grappling axis to one another.

7. A grappling device as claimed in claim 1 including a housing, said grappling head being mounted in said housing for movement relative to said housing in a direction parallel to said grappling axis to apply a load to a component secured in said grappling aperture tending to draw the component inwardly of the housing.

8. A grappling device as claimed in claim 7 including stop means mounted on said housing and disposed radially outwardly from said grappling axis for engaging a portion of the component secured by the grappling head so as to prevent relative rotational movement of said housing with respect to the component when the component is secured by the grappling head.

9. A grappling device comprising (a) a housing having a grappling chamber formed therein, said grappling chamber having a grappling axis extending longitudinally thereof, (b) a grappling head mounted in said grappling chamber for movement relative to said housing in the direction of the grappling axis, said grappling head having a grappling window opening inwardly thereof about said grappling axis, (c) first drive means for driving said grappling head relative to said housing in a direction parallel to said grappling axis, (d) a grappling collar mounted in said head for rotation about said grappling axis, (e) flexible grappling cables each having a first end and a second end, the first ends of said grappling cables being mounted in said grappling head at 120° intervals about said grappling axis, the second end of each cable being mounted in said collar at 120° intervals about said grappling axis, (f) second drive means for rotatably driving said grappling collar relative to said grappling head about said grappling axis, said second drive means being operable to rotate said collar to move said second ends of said flexible cables between a first position in which the cables are taut and extend across the grappling window at 120° circumferentially spaced intervals to intersect one another to provide a grappling aperture therebetween within which a component may be securely located with respect to said housing by engagement with the grappling cables and a second position in which the first and second ends of each cable are more closely adjacent one another, (g) deflection means at at least one end of each cable for urging each of said cables radially outwardly from said grappling axis to assume a concave curvature about said grappling axis when said cables are in said second position.

10. A coupler comprising (a) a first component in the form of a grappling device, (b) a second component connectible to said first component, (c) said grappling device consisting of;
  (i) a grappling head having a grappling window opening inwardly thereof along a grappling axis,
  (ii) at least three flexible grappling cables mounted in said grappling head for movement between a first position in which they are taut and extend across the grappling window at uniformly spaced circumferential intervals and are interwoven to intersect one another to provide a grappling aperture therebetween within which said second component may be securely located with respect to said head by engagement with said grappling cables and a second position in which the grappling aperture is substantially enlarged to admit a component thereto, and
  (iii) drive means mounted on said grappling head for moving said grappling cables between said first and second positions, (d) said second component consisting of;
  (i) a shaft having a longitudinally extending axis, said shaft having a free end and an enlarged head portion at said free end,
  (ii) three grooves formed in the surface of said shaft adjacent said free end inwardly from said enlarged head, said grooves extending transversely of said longitudinal axis in planes which are circumferentially spaced about said longitudinal axis at 120° intervals with respect to one another in a triangular configuration, said grooves extending in transverse planes which are obliquely inclined with respect to said longitudinal axis and are arranged such that each end of each groove is laterally displaced on opposite sides of the ends of each adjacent groove in a configuration corresponding to the interwoven configuration of the cables bounding on the grappling aperture of the first component.

11. A coupler as claimed in claim 10 wherein said shaft has a triangular cross-sectional configuration disposed about 7° out of phase with the triangular configuration of said grooves.

12. A coupler as claimed in claim 10 wherein said grappling device has a face plate mounted on said head outwardly from said head, said face plate having a passage opening therethrough, said passage having a plurality of recesses extending radially outwardly from said gripping axis, said second component having torque shoulders mounted adjacent said shaft and extending radially outwardly therefrom to drivingly engage said recesses of said passage of said face plate such that said first component may apply to torque to said second component to rotatably drive said second component about said grappling axis.

13. A coupler as claimed in claim 10 wherein;
(a) said first component has;
  (i) a face plate mounted on said head outwardly from said grappling window, said face plate having a square passage opening therethrough in axial alignment with said grappling axis,
(b) said second component has;
  (i) a pair of ridges projecting radially outwardly from said shaft and diverging in a direction rearwardly from said head, said ridges having rounded outer edge which engages the edge of said square passage and slides thereon in response to movement of said first and second components towards one another until they are located at opposite corners of said square configuration of said passage in rotational driving engagement with said face plate.

14. A coupler comprising
(a) a male component and a female component,
(b) said female component consisting of;
  (i) a first frame,
  (ii) a face plate at one end of said first frame,
  (iii) a passage opening through said face plate, said passage having a central axis and a peripheral edge extending about said central axis,
  (iv) a plurality of recesses in said peripheral edge extending radially outwardly from said central axis,
  (v) grappling means in said frame,
(c) said male component consisting of;
  (i) a second frame,
  (ii) a shaft mounted in said second frame and projecting outwardly therefrom, said shaft having a longitudinal axis,
  (iii) said frame having torque shoulders spaced radially outwardly from and directed radially outwardly from said shaft,
(d) said grappling means being adapted to engage said shaft when said shaft projects through said passage means and operative to draw said torque shoulders into driving engagement with said recesses of said passage in said face plate such that said components may apply a torque to one another whereby one component may be rotatably driven by the other component.

15. A coupler as claimed in claim 14 wherein said passage means in said face plate is in the form of a square opening and said male component has a pair of ridges projecting radially outwardly from said shaft, said ridges diverging rearwardly from their connection with said shaft, said ridges having rounded outer edges which engage the edge of said square passage and slide therealong in response to movement of the male component towards the female component until said ridges are located at opposite corners of said square configuration of said passage in rotational driving engagement with said face plate.

16. A grappling device comprising:
(a) a grappling head having a grappling window opening inwardly thereof along a grappling axis,
(b) a collar mounted on said head for rotation about said grappling axis,
(c) at least two flexible grappling cables, each grappling cable having a first end mounted on said grappling head and a second end mounted on said collar, said grappling cables being movable, in response to movement of said collar, between a first position in which they are taut and extend across the grappling window at uniformly spaced intervals to intersect one another to provide a grappling aperture therebetween within which a component may be securely located with respect to the head by engagement with said grappling cables and a second position in which said grappling aperture is substantially enlarged to admit a component thereto, and
(d) drive means mounted on the grappling head for rotatably driving said collar to effect movement of said grappling cables to and fro between said first and second positions.

17. A grappling device as claimed in claim 16 having three flexible grappling cables.

18. A grappling device as claimed in claim 17 wherein each grappling cable is interwoven with respect to each adjacent grappling cable when in said first position to transmit a load applied in the direction of the grappling axis to one another.

19. A grappling device as claimed in claim 16 including means for urging each said grappling cables radially outwardly from said grappling axis to assume a concave curvature about said grappling axis in response to movement of said grappling cables to said second position.

20. A grappling device as claimed in claim 16 including a housing, said grappling head being mounted in said housing for movement relative to said housing in a direction parallel to said grappling axis to apply a load to a component secured in said grappling aperture tending to draw the component inwardly of the housing.

21. A grappling device comprising:
(a) a grappling head having a grappling window opening inwardly thereof along a grappling axis,
(b) at least two flexible multi-strand grappling cables having a degree of flexibility sufficient to permit substantial resilient bending thereof, said flexible grappling cables being mounted in said grappling head for movement between a first position in which they are taut and extend across the grappling window at uniformly spaced circumferential intervals to interesect one another and to provide a grappling aperture therebetween within which a component may be securely located with respect to said head by engagement with said grappling cables and a second position in which the grappling aperture is substantially enlarged to admit a component thereto, (c) biasing spring means mounted on said head at at least one end of each grappling cable and engaging said grappling cables to constantly urge the grappling cables in a direction towards said second position, (d) drive means mounted on the grappling head for moving the grappling cables between said first and second positions.

22. A grappling device as claimed in claim 21 having three flexible grappling cables.

23. A grappling device as claimed in claim 22 wherein each grappling cable is interwoven with respect to each adjacent grappling cable when in said first position to transmit a load applied in the direction of the grappling axis to one another.

24. A grappling device as claimed in claim 21 wherein each grappling cable has a first end and a second end, said first end of each grappling cable being secured with respect to said grappling head against angular movement about said grappling axis, said second end of each grappling cable being mounted for angular movement about said grappling axis in a direction towards and away from its first end whereby each grappling cable may be tightened to assume said first position and slackened to assume said second position.

25. A grappling device as claimed in claim 21 including a collar mounted on said head for rotation about said grappling axis, each of said second ends of said grappling cables being mounted on said collar for rotation about said grappling axis between said first and second positions.

26. A grappling device as claimed in claim 21 including a housing, said grappling head being mounted in said housing for movement relative to said housing in a direction parallel to said grappling axis to apply a load to a component secured in said grappling aperture tending to draw the component inwardly of the housing.

* * * * *